US008310601B2

(12) United States Patent
Ahluwalia et al.

(10) Patent No.: US 8,310,601 B2
(45) Date of Patent: Nov. 13, 2012

(54) BROADCAST RECEIVER SYSTEM

(75) Inventors: Keith Ahluwalia, Marlborough (GB);
Simon Atkinson, Heathfield (GB); Dan Budin, Newton, MA (US); Anthony Eaton, Hook (GB)

(73) Assignee: Mirics Semiconductor Limited (GB)

( * ) Notice: Subject to any disclaimer, the term of this patent is extended or adjusted under 35 U.S.C. 154(b) by 169 days.

(21) Appl. No.: 12/994,373

(22) PCT Filed: Jan. 8, 2009

(86) PCT No.: PCT/GB2009/000031
§ 371 (c)(1),
(2), (4) Date: Nov. 23, 2010

(87) PCT Pub. No.: WO2009/144436
PCT Pub. Date: Dec. 3, 2009

(65) Prior Publication Data
US 2011/0096241 A1    Apr. 28, 2011

(30) Foreign Application Priority Data

May 28, 2008 (GB) .................................. 0809633.1

(51) Int. Cl.
*H04N 5/50* (2006.01)

(52) U.S. Cl. ...... 348/731; 348/725; 348/726; 455/179.1; 710/313

(58) Field of Classification Search .......... 348/725–733, 348/552–558; 455/179.1, 180.1–180.3, 182.1, 455/182.3, 150.1; 710/306–317
See application file for complete search history.

(56) References Cited

U.S. PATENT DOCUMENTS

| 4,958,349 A | 9/1990 | Tanner |
| 5,889,823 A | 3/1999 | Agazzi |

(Continued)

FOREIGN PATENT DOCUMENTS

EP    1047217    5/2003

(Continued)

OTHER PUBLICATIONS

United Kingdom Office Action for related application GB0809633.1, dated Feb. 25, 2009.

(Continued)

*Primary Examiner* — Michael Lee
(74) *Attorney, Agent, or Firm* — Wolf, Greenfield & Sacks, P.C.

(57) ABSTRACT

An interface circuit configured to connect between (a) a broadcast receiver tuner and associated circuitry for the receiving and processing of broadcast radio frequency signals, and (b) a general purpose computer device programmed with software demodulation code configured to engage a general purpose processor in signal demodulation functions, the interface circuit comprising: a data interface comprising a packetisation buffer connected to receive (i) digital signal sample data from a signal path of the tuner and associated circuitry and (ii) indications of control settings which are applied to one or more configurable components during taking of the sample data, said packetisation buffer being operable to construct packets comprising blocks of sample data and header information carrying said control settings indications; a control interface configured to receive control instructions from tuner control code running on the general purpose computer device; and a microcontroller operable to receive the control instructions from the control interface and distribute corresponding control settings to configurable components of the tuner and associated circuitry, said microcontroller also being operable to supply indications of relevant control settings to said packetisation buffer.

14 Claims, 10 Drawing Sheets

U.S. PATENT DOCUMENTS

| | | | |
|---|---|---|---|
| 6,263,470 B1 | 7/2001 | Hung | |
| 6,298,461 B1 | 10/2001 | Tong | |
| 6,314,447 B1 | 11/2001 | Lea | |
| 6,360,348 B1 | 3/2002 | Yang | |
| 6,453,109 B1 | 9/2002 | Yamamoto | |
| 6,529,988 B1 | 3/2003 | Yoshikawa et al. | |
| 6,629,287 B1 | 9/2003 | Brink | |
| 6,967,598 B2 | 11/2005 | Mills | |
| 7,016,308 B1 | 3/2006 | Gallagher | |
| 7,239,668 B2 | 7/2007 | De Gaudenzil | |
| 7,813,707 B2 * | 10/2010 | Magnusen et al. | 455/179.1 |
| 2002/0097818 A1 | 7/2002 | Hagenauer | |
| 2003/0142764 A1 | 7/2003 | Keevill | |
| 2004/0257320 A1* | 12/2004 | Wang et al. | 345/87 |
| 2004/0261002 A1 | 12/2004 | Eidson | |
| 2005/0097616 A1 | 5/2005 | Numata | |
| 2006/0046716 A1 | 3/2006 | Hofstaedter et al. | |
| 2007/0067606 A1 | 3/2007 | Lin | |
| 2008/0106652 A1 | 5/2008 | Magnusen et al. | |
| 2008/0177895 A1 | 7/2008 | Laprade | |
| 2008/0276261 A1 | 11/2008 | Munshi | |
| 2009/0106637 A1 | 4/2009 | Kim | |
| 2009/0217286 A1 | 8/2009 | Schmidbauer et al. | |

FOREIGN PATENT DOCUMENTS

| | | | |
|---|---|---|---|
| EP | 1404060 A2 | 3/2004 | |
| EP | 0138078 | 8/2007 | |
| EP | 0793365 | 10/2008 | |
| GB | 2412551 | 9/2005 | |
| GB | 2431309 A | 4/2007 | |
| GB | 2433372 | 6/2007 | |
| GB | 2460417 B | 4/2011 | |
| JP | 2003296036 | 10/2003 | |
| WO | WO 91/05436 A | 4/1991 | |
| WO | WO 01/15443 A | 3/2001 | |
| WO | WO 01/54300 A2 | 7/2001 | |
| WO | WO 2004/082189 | 9/2004 | |
| WO | WO 2009/144436 | 12/2009 | |
| WO | WO 2009/144437 A1 | 12/2009 | |
| WO | WO 2009/144438 A1 | 12/2009 | |

OTHER PUBLICATIONS

United Kingdom Office Action for related application GB0809633.1, dated Aug. 3, 2009.

United Kingdom Office Action for related application GB0809633.1, dated Aug. 6, 2010.

United Kingdom Office Action for related application GB0809633.1, dated Dec. 22, 2010.

United Kingdom Search Report for related application GB0809633.1, dated Nov. 21, 2008.

United Kingdom Search Report for related application GB0809633.1, dated Nov. 14, 2008.

Examination Report from Great Britain Application GB0919151.1.

International Search Report and Written Opinion from PCT Application PCT/GB2009/000031.

Kabatiansky, G. "Error Correcting Coding and Security for Data Networks: Analysis of the Superchannel Concept", John Wiley & Sons Ltd., 2005.

Matolak, "Variable-Complexity Trellis Decoding of Binary Convolutional Codes", IEEE Transactions on Communications, vol. 44, No. 2, pp. 121-126, 1996.

International search report and written opinion for International Application No. PCT/GB2009/000036, mailed May 12, 2009.

International search report and written opinion for International Application No. PCT/GB2009/000046, mailed May 12, 2009.

Quinn, "Gnu Radio Opens an Unseen World", WIRED.COM, [online], Jun. 5, 2006, pp. 1-2, XP002525001, Internet, Retrieved from the Internet: URL:http://www.wired.com/print/science/discoveries/news/2006/06/70933> [retrieved on Apr. 23, 2009].

Rahul, et al., "Supporting Integrated MAC and PHY Software Development for the USRP SDR", Networking Technologies for Software Defined Radio Networks, 2006. SDR '06.1st IEEE Workshop on, IEEE, PI, Sep. 1, 2006, pp. 68-77.

Zhi, et al., "Spectrum Sensing, Access and Coexistence Testbed for Cognitive Radio using USRP", Circuits and Systems for Communications, 2008. ICCSC 2008. 4th IEEE International Conference on, IEEE, Piscataway, NJ, USA, May 26, 2008, pp. 270-274.

* cited by examiner

BROADCAST RECEIVER SYSTEM

PRIORITY APPLICATIONS

This application is a national phase filing under 35 U.S.C.§371 of International Application No. PCT/GB2009/000031, filed Jan. 8, 2009, which claims priority to British Application No. 0809633.1, filed May 28, 2008. Both of these applications are hereby incorporated herein by reference in their entireties.

FIELD OF THE INVENTION

The present invention relates generally to broadcast receivers. More particularly, the various embodiments of the present invention relate to apparatus and methods suitable for receiving digital radio and television broadcasts on all known frequencies and standards, examples of which include DAB, DVB and ATSC.

BACKGROUND OF THE INVENTION

Television (TV) and radio is a now ubiquitous telecommunication medium used for broadcasting and receiving images and/or sound using radio frequency (RF) signals. All televisions and radios utilise a receiver system in one form or another. A receiver is an electronic circuit that receives its input from an antenna, uses one or more filters to separate a required signal from other signals picked up by the antenna, amplifies the required signal to an amplitude suitable for further processing, and finally demodulates and decodes the signal into a consumable form for the end user, e.g. sound, pictures, digital data, etc.

However, different countries use different types of broadcast standard for both television and radio signals, most of which are to varying extents incompatible with each other. As a result, receiver technology varies widely country to country according to the broadcast standard(s) in use.

For analogue TV, there are a wide range of different standards country to country. Examples of the most common analogue television standards are: PAL, NTSC, and SECAM. The situation with worldwide digital television (DTV) is arguably simpler by comparison, with most current digital television systems using an MPEG-2 video codec based on the MPEG-2 multiplexed data stream standard. However, the digital TV situation is complicated by the fact that digital standards differ significantly in the details of how the MPEG-2 stream is converted into a broadcast signal, and ultimately how it is decoded for viewing.

One standard by which DTV signals are transmitted is through Digital Video Broadcasting (DVB), which represents a suite of internationally accepted open standards for digital television. DVB systems distribute signal data using a variety of approaches, including by satellite (DVB-S, DVB-S2 and DVB-SH; also DVB-SMATV for distribution via SMATV); cable (DVB-C); terrestrial television (DVB-T, DVB-T2) and digital terrestrial television for handhelds (DVB-H); and via microwave using DTT (DVB-MT), the MMDS (DVB-MC), and/or MVDS standards (DVB-MS).

Although DVB is widely used in Europe, North America uses ATSC (Advanced Television Systems Committee) standards and Japan uses the ISDB (Integrated Services Digital Broadcasting) standards. Each of these may be used over different broadcast media e.g. terrestrial, cable or satellite media. Depending on the medium, different modulations are used, e.g. COFDM (Coded Orthogonal Frequency Division Multiplexing) for terrestrial transmissions, QAM (Quadrature Amplitude Modulation) for cable transmissions and QPSK (Quadrature Phase Shift Keying) for satellite transmissions.

The situation is similar in radio with analogue standards such as AM and FM and a range of digital standards such as Eureka 147 (branded as "DAB"), DAB+, HD Radio and so on.

The many incompatible broadcast transmission standards used in today's digital broadcasting market requires manufacture of dedicated receivers using dedicated algorithms to perform the necessary processing (demodulation, error correction, decoding, etc.) of received digital signals. However, having many dedicated solutions is undesirable for a number of reasons. For example, having receiver hardware customized for each standard increases the development costs and ultimately means that each individual product is tied to one standard, often operable in only one region. The upshot is that currently known technology is generally inflexible as well as expensive to make.

No currently known technology provides a multi-standard broadcast receiver which is compatible with any global transmission standard and easily upgraded to future standards. Furthermore, no currently known technology provides a broadcast receiver which utilizes general purpose computer hardware in order to efficiently reduce development, manufacturing and implementation costs.

SUMMARY OF THE INVENTION

According to embodiments of the invention, there are provided circuits, systems, methods and computer code as set out in the appended claims.

According to one embodiment of the invention there is provided an interface circuit configured to connect between (a) a broadcast receiver tuner and associated circuitry for the receiving and processing of broadcast radio frequency signals, and (Io)a general purpose computer device programmed with software demodulation code configured to engage a general purpose processor in signal demodulation functions. The interface circuit comprises: a data interface comprising a packetisation buffer connected to receive (i) digital signal sample data from a signal path of the tuner and associated circuitry and (ii) indications of control settings which are applied to one or more configurable components during taking of the sample data, said packetisation buffer being operable to construct packets comprising blocks of sample data and header information carrying said control settings indications; a control interface configured to receive control instructions from tuner control code running on the general purpose computer device; and a microcontroller operable to receive the control instructions from the control interface and distribute corresponding control settings to configurable components of the tuner and associated circuitry, said microcontroller also being operable to supply indications of relevant control settings to said packetisation buffer.

According to another embodiment of the invention the indications of relevant control settings comprise data sampling rate indications applying in respect of the signal sample data.

According to another embodiment of the invention the indications of relevant control settings comprise tuner frequency indications applying in respect of the signal sample data.

According to another embodiment of the invention the indications of relevant control settings comprise tuner gain indications applying in respect of the signal sample data.

According to another embodiment of the invention the interface circuit further comprises a compression buffer connected between (i) the tuner and associated circuitry and (ii) the packetisation buffer.

According to another embodiment of the invention the microcontroller can disable or enable the compression in dependence upon whether or not the data transfer rate between the interface circuit and the general purpose computer device exceeds a predetermined threshold rate.

According to another embodiment of the invention the compression buffer and associated logic implement a bit dropping algorithm.

According to another embodiment of the invention the interface circuit further comprises a standard computer interface deployed between the interface circuit and the general purpose computing device.

According to another embodiment of the invention the standard computer interface is a USB interface.

According to one embodiment of the invention there is provided an interface implemented at least partly in computer code and configured to connect between (a) a demodulator implemented in software on the general purpose computing device and (b) an interface circuit associated with a separate hardware tuner for receiving broadcast signals. The interface comprises: a data interface for receiving packetised signal sample data including header information comprising control settings indications which are applied during taking of the sample data; a control interface operable to receive control instructions from tuner control code, setting control inputs of configurable tuner components and further operable to forward said control instructions to a complimentary interface associated with the tuner circuitry; tuner control code operable to issue control instructions intended to change a control setting of a configurable component of the tuner circuitry; a log of at least one issued instruction; and a packet monitoring module operable to detect control settings indications for configurable components of the tuner and to compare them with the log to determine when an instruction issued by the tuner control code has been implemented at the configurable component of the tuner circuitry.

According to one embodiment of the invention there is provided an interface implemented at least partly in computer code and configured to connect between (a) a demodulator implemented in software on the general purpose computing device and (b) an interface circuit associated with a separate hardware tuner for receiving broadcast signals. The interface comprises: a data interface for receiving packetised signal sample data including header information comprising control settings indications, which applied during taking of the sample data; a control interface operable to receive control instructions from tuner control code, setting control inputs of configurable tuner components and further operable to forward said control instructions to a complimentary interface associated with the tuner circuitry; tuner control code operable to issue control instructions intended change a control setting of a configurable component of the tuner circuitry; a timer module recording time since instruction issue, operable to determine that an instruction issued by the tuner control code has been implemented at the configurable component of the tuner circuitry a predetermined period after issue.

According to another embodiment of the invention the tuner control code is configured to issue instructions applying to an analogue to digital converter associated with the tuner circuit and a detected indication comprises a data sampling rate applying in respect of the signal sample data.

According to another embodiment of the invention the tuner control code is configured to issue instructions applying to frequency selection of the tuner and a detected indication comprises a tuner frequency applying in respect of the signal sample data.

According to another embodiment of the invention the tuner control code is configured to issue instructions relating to amplifier again of the tuner and a detected indication comprises a gain value applying in respect of the signal sample data.

According to another embodiment of the invention the tuner and modulator are capable of handling TV broadcast signals.

BRIEF DESCRIPTION OF THE DRAWINGS

For a better understanding of the invention and as to how the same may be carried into effect, reference will now be made, by way of example only, to the accompanying drawings, in which.

DETAILED DESCRIPTION

Those skilled in the art will appreciate that while this disclosure describes what is considered to be the best mode and, where appropriate, other modes of performing the invention, the invention should not be limited to the specific configurations and methods disclosed in this description of the preferred embodiment.

Figure 1:
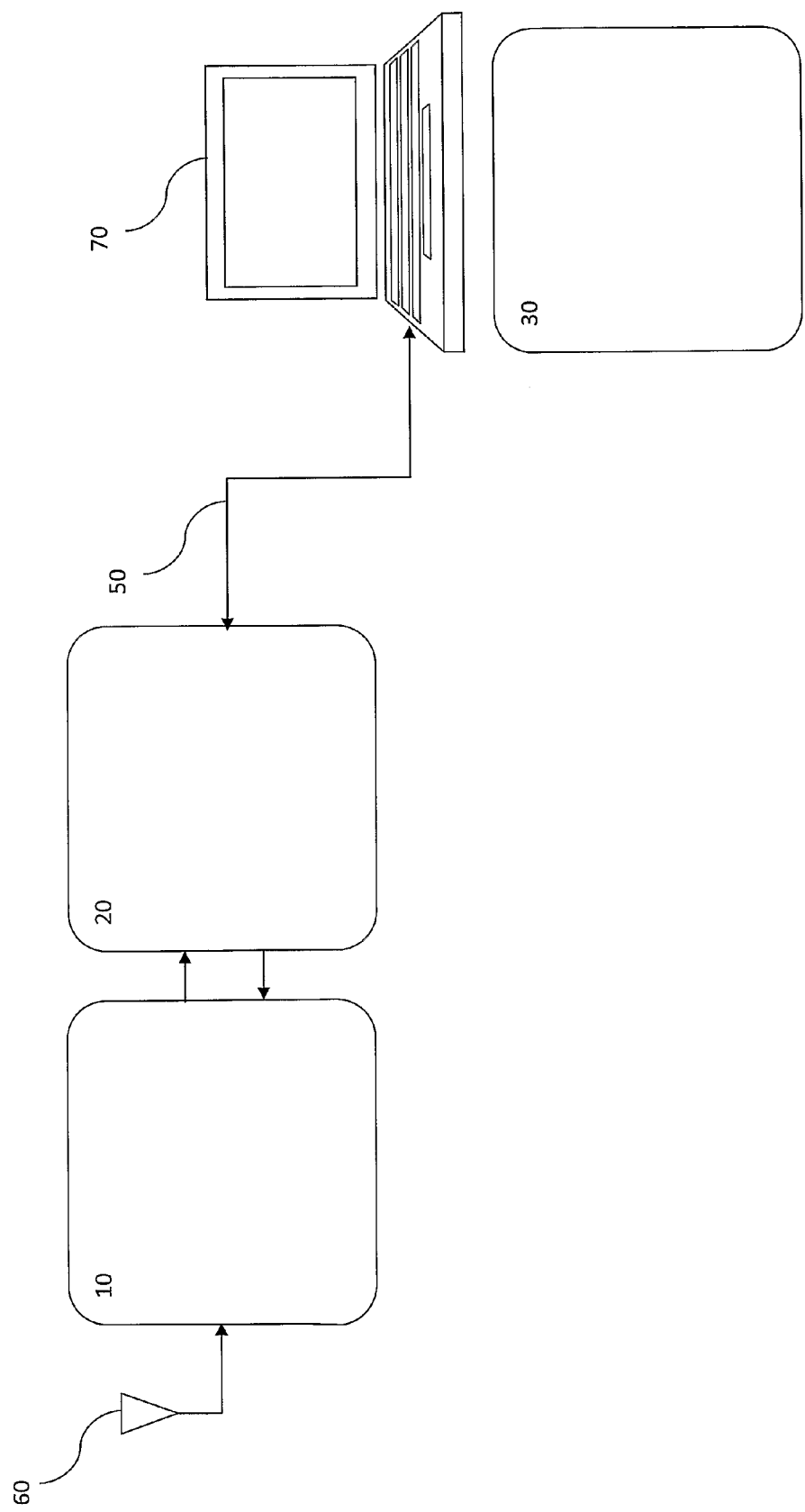
FIG. 1 shows an embodiment of a broadcast receiver system of the present invention.

FIG. 1 shows an embodiment of a broadcast receiver system of the present invention. The broadcast receiver system comprises: a tuner 10, a tuner-to-demodulator bridge circuit ("bridge") 20 and a software demodulator 30. The term "bridge" or "bridge circuit" as used herein should be construed to mean any circuit deployed between an analogue tuner and a demodulator. According to one embodiment, as shown in FIG. 1, the tuner 10, bridge 20 and software demodulator 30 are deployed as a modular system comprising three separate components, operably linked by suitable data connections. According to another embodiment, the tuner 10 and bridge 20 may be combined into a single module, e.g. with the elements of the tuner and bridge residing on the same chip. According to yet another embodiment, each of the hardware components tuner 10 and bridge 20 may be combined into a single module, for instance, a PC expansion device such as a PCI-Express Card, minicard or USB device, or dedicated computer chip residing, for example, on a computer motherboard. According to one embodiment, the broadcast receivers system of the present invention is incorporated on to a mobile device such as a mobile phone.

Previously known broadcast receiver technologies have generally been deployed with a hardware tuner for receiving broadcast signals, and a dedicated hardware demodulator used to recover the information content from the carrier wave of an incoming radio frequency signal. However, these previously known technologies have been expensive to manufacture due to the cost of the hardware demodulator components, and typically limited to operating according to only a single broadcast standard.

In embodiments of the present invention, the software demodulator 30 is operable to use the processing power of one or more general-purpose microprocessors on computing device 70, thus shifting the processing burden from dedicated demodulator hardware to software. The computing device 70 is generally a desktop computer, laptop or other similar device with one or more general-purpose microprocessors suitable for this task.

Also shown in FIG. 1 is antenna 60 for receiving an analogue or digital broadcast signal, generally a radio or television transmission signal, connected to tuner 10. Although only a single antenna is shown, according to certain embodiments more than one antenna may be connected to tuner 10, enabling for instance dual antenna implementations for improved signal strength, or to allow different antenna types to be connected to the tuner simultaneously, or in the alternative.

The broadcast receiver system further comprises a computer data connection 50 between bridge 20 and computer 70. The computer data connection 50 may be any suitable computer interface, e.g. a serial interface such as USB, FireWire or otherwise.

Figure 2:
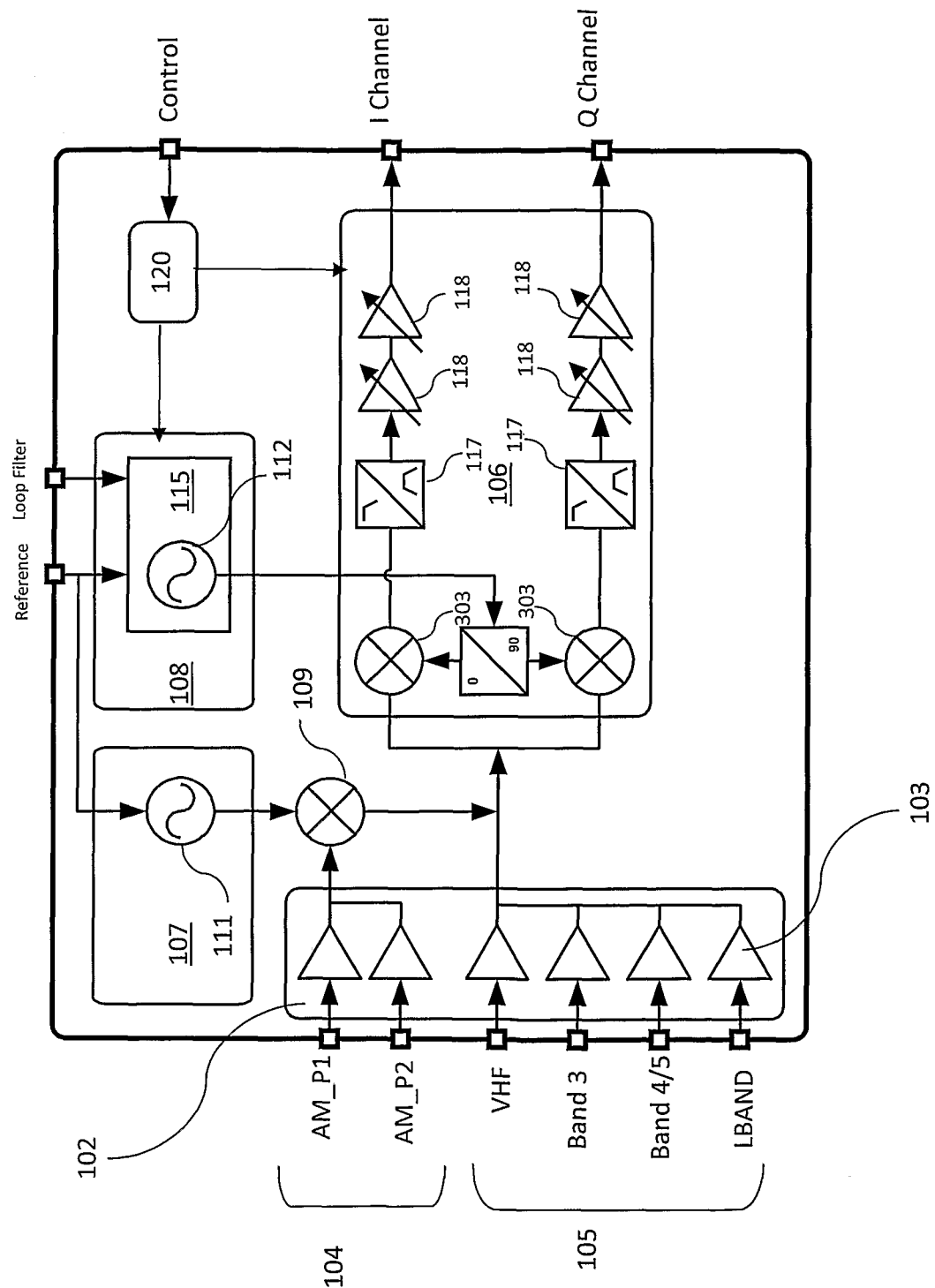
FIG. 2 shows an example of the tuner 10.

FIG. 2 shows more detail of the tuner 10. Broadly, the tuner 10 is operable to detect radio-frequency (RF) signals, then amplify and convert them to a form suitable for further processing. Accordingly, the tuner 10 further comprises an antenna interface 102 with one or more low-frequency 104 and one or more high frequency 105 inputs, each input capable of connection to an antenna suitable for receiving radio-frequency signals supporting a wide range of broadcast frequencies. In the example shown in FIG. 2, low-frequency antenna input 104 receives various AM-band frequencies, and the high frequency antenna input 105 receives VHF, Band 3, Band 4/5 and L-Band radio-frequency signals. According to preferred embodiments, the tuner interface supports a wide frequency spectrum coverage from 150 KHz to 1.9 GHz, as summarised in the table below:

| Name | Frequency |
| --- | --- |
| LW/MW/SW | 150 kHz-30 MHz |
| VHF Band II | 64-180 MHz |
| Band III | 162-240 MHz |
| Band IV/V | 470-960 MHz |
| L-Band | 1450-1900 MHz |

The tuner 10 of embodiments of the present invention is operable to receive incoming signals through interface 102 at both narrow and wide frequency bandwidths. According to preferred embodiments, the tuner 10 supports bandwidths selected from one or more of the following: <200 kHz, 200 kHz, 300 kHz, 600 KHz; 1.536 MHz; and/or 5-8 MHz. However, other bandwidths may be supported as required.

By supporting the receiving of the above-mentioned frequencies and bandwidths, the tuner 10 is compatible with any signal frequency and/or bandwidth of the various broadcast standards currently used throughout the world. Examples of supported broadcast standards include but are not limited to: T-DMB, DVB-T/H, ISDB-T, MediaFLO, DTMB, CMMB (UHF), T-MMB, AM, FM, DRM, DAB, HD Radio.

Throughout this specification, the term "broadcast reception mode" shall be used to mean each of the particular configurations of the tuner 10, bridge 20 and/or software demodulator 30 used to support one or more of the different broadcast standards.

Antenna interface 102 typically further comprises one or more amplifiers 103 on each of the inputs, the one or more amplifiers being operable to increase the amplitude of incoming radio-frequency signals of whatever frequency or bandwidth. Generally the one or more amplifiers 103 are band-optimized low noise amplifiers (LNAs) deployed to amplify signals captured by antenna 60. The LNAs may be located close to the antenna input to minimize losses in the feed paths passing the incoming signal to the mixer/filter block 106. Although low noise amplifiers are provided as an example, other amplifiers may be used in addition to or as an alternative to low noise amplifiers as required.

Before reaching the mixer/filter block 106, an additional frequency mixer 109 may be used to change the input signal to a more desirable frequency. This is particularly the case with low-frequency input signals such as AM signals arriving at low frequency input 104. The tuner clock 107 comprises an up-converting phase locked loop (PLL) driving VCO 111. The VCO 111 produces a signal which is in turn supplied to the mixer 109 along with the amplified signal from the low noise amplifier in antenna interface 102. In this regard, input signals (particularly low-frequency ones) may be up-mixed to a higher frequency before passing to the mixer/filter block 106 for down-conversion and pre-selection.

The tuner 10 further comprises a mixer/filter block 106 for down conversion of the input signal received at interface 102 and for pre-selection of the wanted signal. The mixer/filter block 106 is configurable in terms of frequency, filtering and gain, and is operable to split the received input signal into in-phase (I) and quadrature (Q) components using an appropriate phase filter. The mixer/filter block 106 comprises a pair of mixers 303 driven with in-phase and quadrature oscillator signals, a pair of filters 117, each settable by associated resistors and capacitors which enable both coarse and fine bandwidth adjustment and one or more variable amplifiers 118. In one embodiment, the filters may be configured as low pass filters, or in another embodiment, they may utilize the 90 degree phase relationship between the I and Q paths to create a complex polyphase bandpass filter response. In the preferred embodiment, the choice of whether to use a low pass response or a bandpass response is selectable through tuner control 120. Tuner control 120 is also used to control of a controllable aspects of the tuner 10 as it receives instructions from microcontroller 202.

The mixer/filter block 106 is driven by a second clock produced by VCO 112 within the tuner clock unit 108. Architecturally, the PLL within the tuner clock unit 108 is analogous to the bridge clock 208's PLL described with reference to FIGS. 4 and 7 below, however, tuner clock unit 108 differs from bridge clock 208 in its implementation detail as set out below.

According to one embodiment of the invention, tuner clock unit 108 uses a clock multiplying phase lock loop (PLL), for example, a fractional-N synthesizing PLL 115. A conventional synthesizer uses a phase-locked loop (PLL) containing programmable division ratio dividers whose division ratio is fixed for any one frequency setting. However, the frequency resolution of such synthesizers is generally limited by the phase frequency detector rate. Hence if a 5 kHz phase detector rate is used, then the resolution will be limited to 5 kHz. However, the Fractional-N synthesis PLL arrangement of the broadcast receiver system of the embodiments of the present invention provides much finer frequency control.

The clock produced by tuner clock unit 108 is derived from at least one voltage controlled oscillator (VCO) 112. Broadly, the fractional-N PLL 115 is operable to lock the one or more VCOs to a frequency that is a fractional multiple of a predetermined reference frequency. In the fractional-N PLL 115, the VCO is never exactly "on frequency". In other words, it is never an exact integer multiple of the reference frequency. In one cycle of the reference frequency, the VCO frequency will appear to be high by a certain amount. In the next cycle, the VCO will appear to be low by an equal amount. The fractional-N PLL 115 will therefore attempt to ramp the VCO frequency up, then down in alternate cycles of the phase detector.

Figure 3:
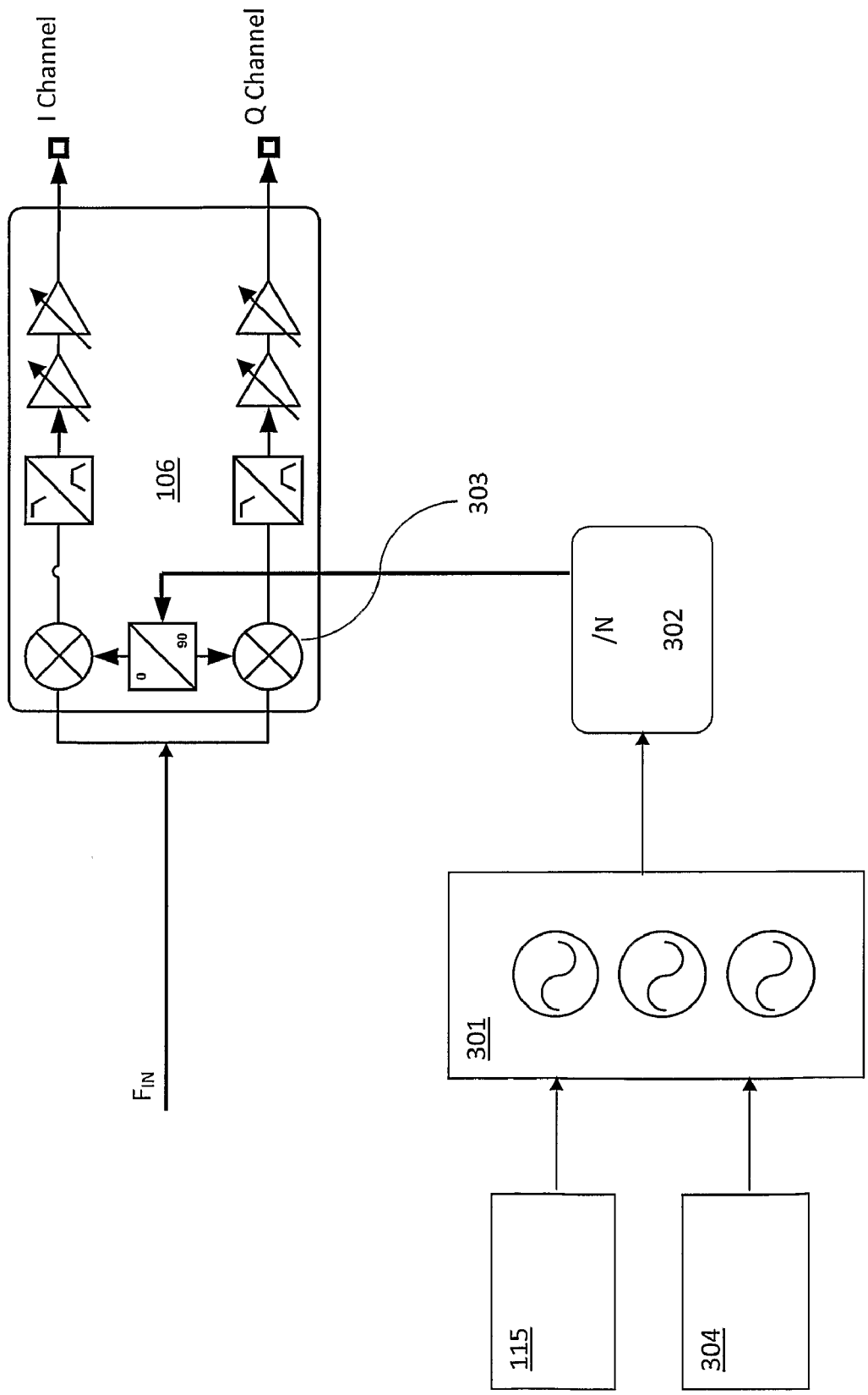
FIG. 3 shows an embodiment of the present invention wherein the clock produced by tuner clock unit 108 is derived from one of three VCOs.

FIG. 3 shows an embodiment of the present invention wherein the clock produced by tuner clock unit 108 is derived from one of three VCOs 301, each able to cover a predetermined range of frequencies. According to one example, the first VCO may cover the range 1800 to 2500 MHz, the second VCO may cover the range 2400 to 3000 MHz, and the third VCO may cover the range 2900 to 4000 MHz. Collectively, therefore the three VCOs in this example are able to provide an output clock covering the frequency range 1800 to 4000 MHz. According to this setup, control logic 304 determines the relevant VCO suitable for generating an appropriate signal to drive mixer/filter block 106 based on the frequency of the incoming signal.

The broadcast receiver system according to one embodiment is operable to receive transmission signals in the frequency range 150 KHz to 1900 MHz. Due to the up-mixing operation on the low frequency AM signals, $F_{in}$ (as shown in FIG. 3) may vary from 64 MHz to 1900 MHz. With a suitable programmable N-divider 302 situated after the three VCOs 301, it is possible to down-convert (through mixer 303) any incoming signal in the range indicated above. According to this example, integer N may take on a value of 32, 16, 4 or 2 depending on the broadcast mode, i.e. band 2, band 3, band 4/5 and L-Band, respectively. However, other integers may be used where appropriate.

The outputs of the tuner 10 are the in-phase (I) and quadrature (Q) signal components generated by mixer/filter block 106. The associated I and Q channel paths are operably connected to equivalent I and Q inputs on the bridge 20, thus enabling the channel data to be transmitted between the tuner 10 and the bridge 20. It should be noted, however, that according to some examples it may not be necessary to use both I and Q channel paths, in which case one path may be bypassed appropriately. This is particularly the case for zero and low intermediate frequency (IF) samples arriving at mixer/filter 106.

Figure 4:
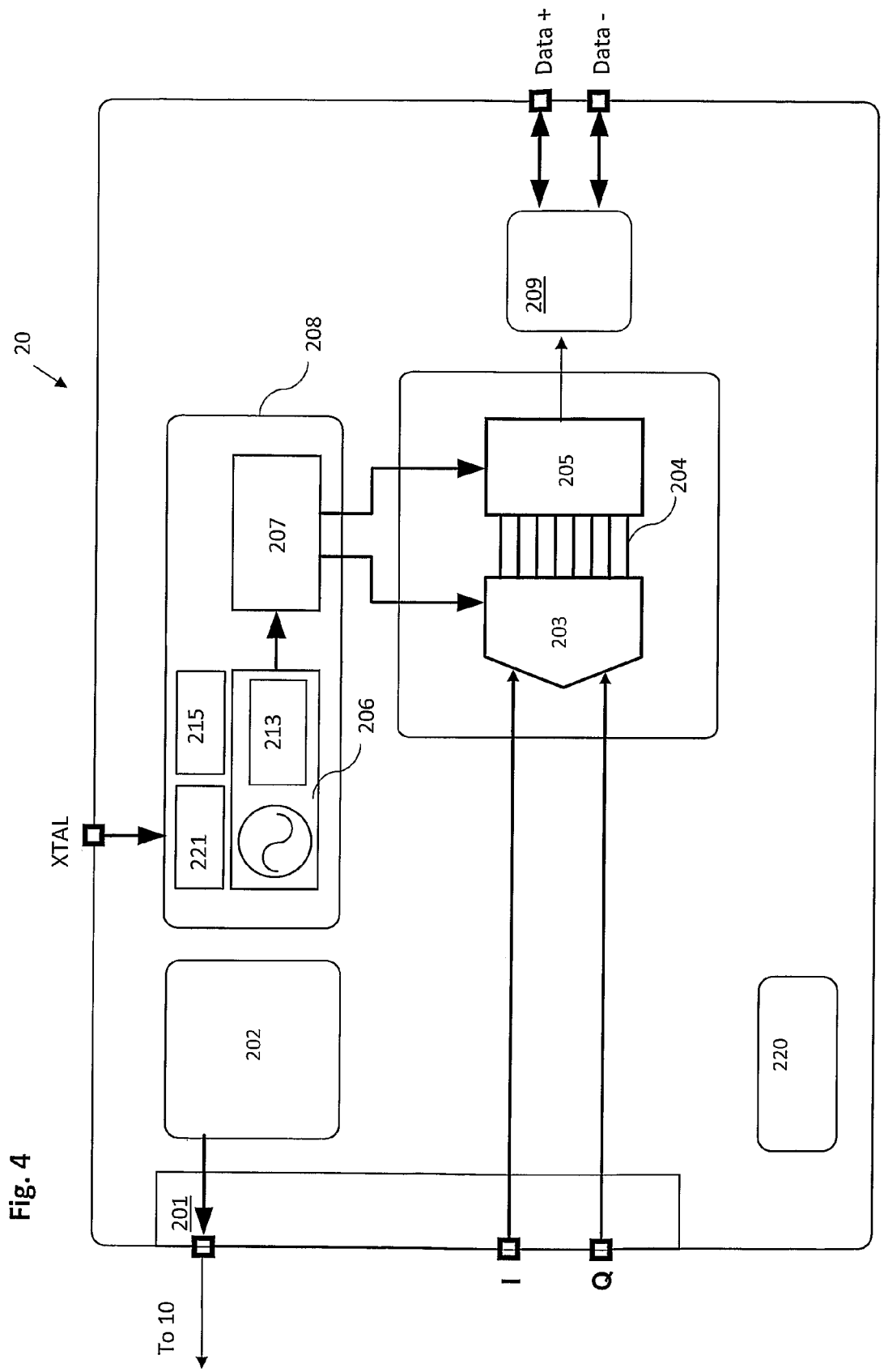
FIG. 4 shows more detail of the bridge 20 according to an embodiment of the present invention.

FIG. 4 shows the bridge 20 according to an embodiment of the present invention. The bridge comprises: a tuner interface 201, a microcontroller 202, a dual analogue to digital converter (ADC) 203, a digital signal processor (DSP) 205, a frequency synthesiser module 206, a clock generator 207, and a computer interface 209. The bridge 20 further comprises a power management module 220 distributing the necessary power supply and bias references to the various components of the bridge 20. For convenience, the frequency synthesiser 206 and clock generator 207 will be collectively referred to as "the clock" 208. The clock is described in more detail with reference to FIG. 7.

The microcontroller 202 is a dedicated on-chip processor, in contrast to the general-purpose microprocessor residing in computer 70 and used by the software demodulator 30 according to embodiments of the invention. The microcontroller 202 is connected to: the tuner 10 via tuner interface 201 feeding into control 120; the bridge 20 (controlling the analogue to digital converter (ADC) 203 and the digital signal processor (DSP) 205; and the computer interface 209 by suitable data connection.

According to embodiments of the invention, the microcontroller 202 is operable to send control instructions to the tuner 10 once the microcontroller receives control instructions from the host computer 70. Examples of these instructions include but are not limited to: setting the tuner reception frequency by setting the appropriate filtering in mixer/filter 106, setting the gain of one or more amplifiers 118, performing band selection, and configuring filter bandwidth. The microcontroller 202 also sends control instructions to the ADC 203, for example to set the sample frequency, and to DSP 205 and/or computer interface 209. Examples of the instructions sent to the DSP 205 and/or computer interface 209 include but are not limited to: turning on/off compression, configuring the rate control, configuring the clock rate and configuring other controllable aspects of the DSP and/or computer interface 209 by issuing suitable instructions.

The tuner interface 201 supports two-way data communication. Therefore, as well as enabling the microcontroller to interface with the tuner 10, the tuner interface 201 also supports the receiving of data from tuner 10. As stated with reference to FIG. 2 above, the outputs of the tuner 10 are the in-phase (I) and quadrature (Q) components of the input signal from the antenna interface 102 passed through programmable filter within mixer/filter block 106. After being received at tuner interface 201, the I and Q components are each separately passed to an analog to digital converter (ADC) 203 via suitable transmission paths. According to a preferred embodiment, the I and Q component paths each has its own ADC. Optionally, the I and Q components may first pass through one or more additional amplifiers on said transmission paths before reaching the ADC.

As will be known to the person skilled in the art, the ADC (analog-to-digital converter) 203 is an electronic integrated circuit used to convert continuous signals from an input voltage or current to discrete digital integers for digital processing. In this case, the input signal generally pertains to a broadcast transmission signal of some sort. The digital output provided by the ADC 203 may utilise different coding schemes, for example, Gray code, two's complement or any other suitable coding scheme, as required.

According to one example, the ADC 203 is an "over-sampling" ADC. With over-sampling ADCs, signals are sampled with a sampling frequency significantly higher than twice the bandwidth, or highest frequency, of the incoming signal. The result is that the quantization noise (i.e. the difference between the analog signal value and quantized digital value that arises due to rounding and/or truncation) is introduced as a flat power spectral density spread over the whole range of frequencies that can viably pass through the converter.

A known type of over-sampling ADC used according to embodiments of the present invention is the "Sigma-Delta" ADC. A Sigma-Delta ADC over-samples the desired signal by a predetermined large factor on a required signal band. Sigma-Delta converters are characterised in that they produce disproportionately more quantization noise in the upper portion of their output spectrum. By running a Sigma-Delta ADC at some predetermined multiple of the target sampling rate, and low-pass filtering the over-sampled signal down to a lower rate, it is possible to obtain a resulting signal with less noise than the average, when considered over the entire band of the converter. Hence using a Sigma Delta ADC obtains a higher effective resolution.

A power optimisation scheme is employed on the ADC 203 to optimize power consumption, particularly for low bandwidth signals where the power requirements are reduced. This power optimization scheme may be sample rate dependent, and/or dependent on some other varying system attribute such as the current broadcast reception mode. This dependent optimization is generally implemented via local decode logic within the ADC 203 based on the state of a control word generated by microcontroller 202. According to one example, a "DCCG_MODE" control word appropriately scales the ADC bias conditions between maximum and minimum sample rate modes. In this way the internal circuits within the ADC 203 are set to consume more power when they need to, for example when operating at high sample rates. According to another example a suitable control word is also used to disable one of the two ADCs (either the I or Q path ADC). This mode may be particularly useful for intermediate frequency (IF)-based signal receptions where a 2-channel I and Q interface out of mixer/filter block 106 is not required.

According to one embodiment, the bridge 20 incorporates a level shifting, attenuating input buffer (not shown), for instance a 6 dB attenuating input buffer, at the front-end of the ADC 203 to optimize the interface between the tuner 10 and the generally low voltage ADC 203. This input buffer can also act to limit the maximum signal level into the ADC 203.

Previously known broadcast receivers suitable for digital radio and television broadcasts typically used a pipelined-ADC implementation. These implementations generally operated with an analog automatic gain control (AGC) loop coupled around the ADC to effectively maximize signal occupancy within the ADC's dynamic range. Such implementations typically achieve less than 10 Effective Number of Bits (ENOB) resolution and are difficult to implement in modern low-voltage semiconductor technology without the use of complex calibration techniques and algorithms. However, to provide algorithmic flexibility in the receiver AGC approach and to allow for higher latency AGC loops (due to USB interface latencies) an ENOB resolution of greater than 10 is preferable. The fundamental signal to quantization noise ratio (SQNR) of the ADC 203's architecture according to embodiments of the present invention is 10.6 ENOB at the highest data rates required. This is achieved with low precision components in modern low voltage semiconductor technology and without the need for complex calibration techniques and algorithms.

According to a preferred embodiment of the present invention, there is a dual ADC deployment, i.e. an ADC 203 on each of the I and Q component paths, each of these ADCs providing more than 10 Effective Number of Bits (ENOB) with a 12× oversampling rate. Preferably, the one or both of these dual ADCs can be enabled/disabled as required.

The ADC output 204 is passed to the DSP 205 in a suitable form. For example, the output from the ADC 204 is passed to the DSP 205 as a 4-bit, 2's complement word for subsequent decimation and digital filtering processes.

Figure 5:
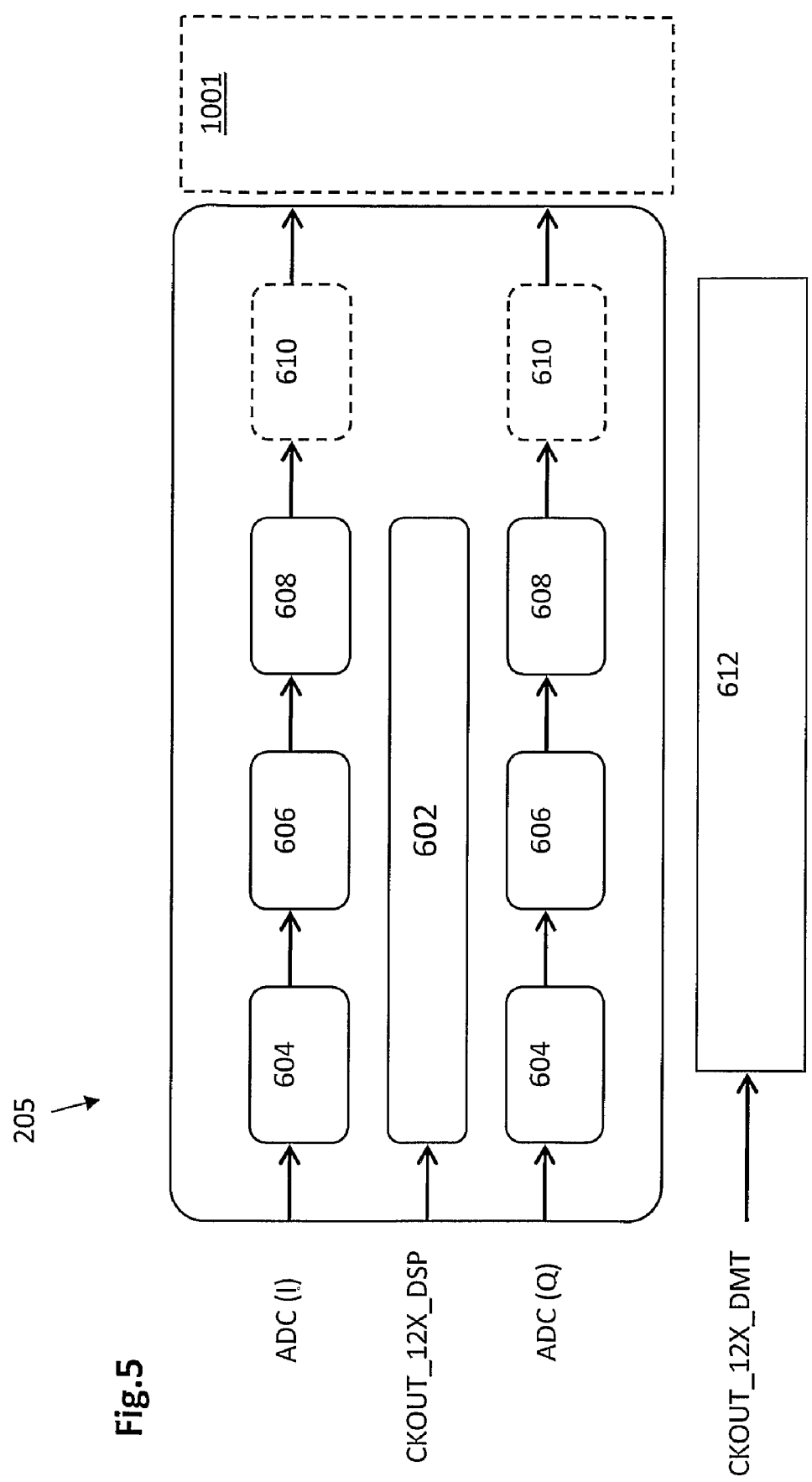
FIG. 5 shows more detail of the digital signal processor (DSP) according to embodiments of the present invention.

FIG. 5 shows an example of the digital signal processor (DSP) 205 according to embodiments of the present invention. The input signals to the DSP 205 are the two output components from the ADC 203, i.e. the in-phase (I) and quadrature (Q) components, and as well as the clock output signal from clock 208 (CKOUT_12X_DSP), which is described in more detail with reference to FIG. 7. Broadly, the clock output signals from clock 208 are used to scale the clock rate of both the ADC and DSP on demand according to the broadcast reception mode. In the DSP 205 the clock management module 602 provides the relevant clock signals to the individual DSP elements 604, 606, 608 and 610 of DSP 205. The table below provides some examples of the different clock rates produced from tuner clock unit 208 and used in the ADC 203 and DSP 205 for different broadcast reception modes:

| Broadcast Reception Mode | CKOUT_12X [MHz] |
|---|---|
| DVB 8 MHz | 109.7 |
| DVB 7 MHz | 96 |
| DVB 6 MHz | 82.3 |
| DVB 5 MHz | 68.4 |
| DAB | 24.576 |

Each of the in-phase (I) and quadrature (Q) components received from the ADC 203 follows a predetermined path within the DSP 205. According to one embodiment, the path comprises: a cascaded integrator-comb (CIC) filter 604, a first finite impulse response (first FIR) filter 606, a second finite impulse response (second FIR) filter 608 and, optionally, an infinite impulse response (IIR) filter 610. The DSP 205 further comprises a DMT module 612 for debug and manufacturing tests.

The cascaded integrator comb (CIC) filter 604 is a known optimized class of finite impulse response filter for efficiently performing decimation and interpolation on incoming signals. In this case, the CIC 604 converts a high rate, low resolution signal to a high resolution through a process of down conversion.

The finite impulse response (FIR) filters 606, 608 respond to a Kronecker delta input, 'finitely' because their response settles to zero in a finite number of sample intervals. The first finite impulse response filter 606 is a half band filter. The half band filter is a specific type of FIR filter where the transition region is centered at one quarter of the sampling rate (Fs/4). Specifically, the end of the passband and the beginning of the stopband are equally spaced on either side of Fs/4. The second finite impulse response filter is a full low pass filter that passes one frequency band and attenuates frequencies above that band. Both the first and second FIR filters are used for performing channel frequency filtering in order to clean the incoming I and Q components of unwanted signal energy.

In contrast to the finite impulse response (FIR) filters, 606, 608, the infinite impulse response (IIR) filter 610 has internal feedback and may continue to respond indefinitely. This optional infinite impulse response filter is used for some digital TV modes for minimizing/reducing signal interference.

Thus, the DSP 205 filtering according to embodiments is optimized appropriately for signal bandwidth. To this effect, the DSP can be scaled by the clock 208 based on the broadcast receiver mode.

Figure 6:
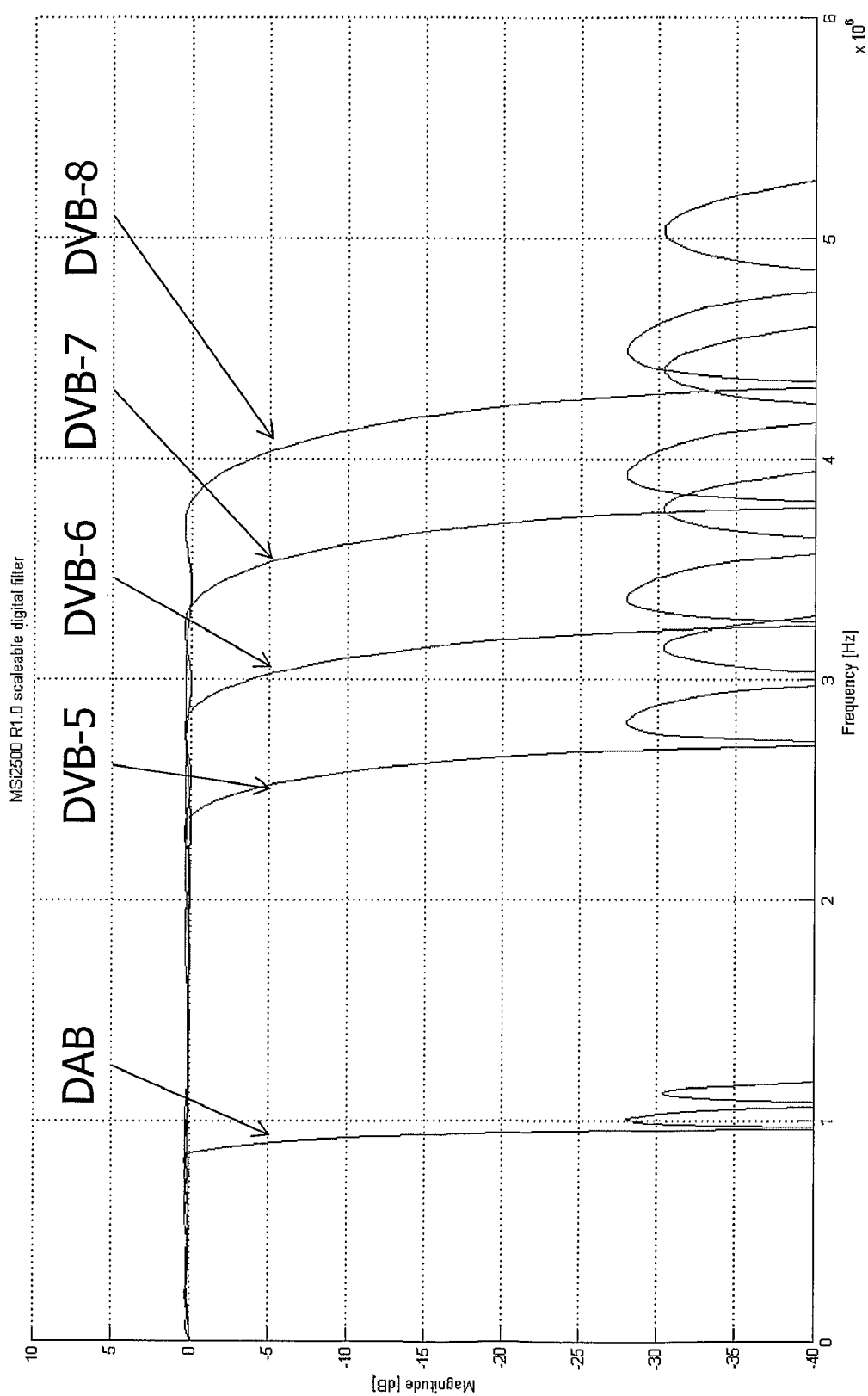
FIG. 6 shows an example graph illustrating the scalability of the digital filtering in terms of magnitude as a function of frequency, in this case for the DAB, DVB-5 MHz, DVB-6 MHz, DVB-7 MHz and DVB-8 MHz modes.

FIG. 6 shows an example graph illustrating the scalability of the digital filtering in terms of magnitude as a function of frequency, in this case for the DAB, DVB-5MHz, DVB-6MHz, DVB-7 MHz and DVB-8 MHz modes. By adjusting the clock rate of the DSP using the clock 208, it is possible to digitally filter the entire range of broadcast frequencies and standards.

The DSP 205 according to embodiments of the invention has a filter pass-through mode which enables certain signals, usually narrow band signals (e.g. ISDB-T1seg, FM, AM, DRM), to pass through the DSP path on an "intermediate frequency" without filtering. In these modes implementing final de-rotation and filtering in software by software demodulator 30 is more efficient.

Referring again to FIG. 4, the clock unit 208 simultaneously feeds both the ADC 203 and DSP 205. Collectively, the data-conversion performed by the ADC and clock generation performed by the clock 208 may be referred to herein as data-conversion and clock generation, and abbreviated "DCCG". According to a preferred embodiment of the invention, clock 208 is a clock multiplying phase lock loop (PLL), for example, a type-2 fractional-N 213 PLL with an integrated loop filter 215. The loop filter 215 according to one example uses an active capacitor multiplier (for instance 20X) in order to minimize the silicon area of the loop filter.

Figure 7:
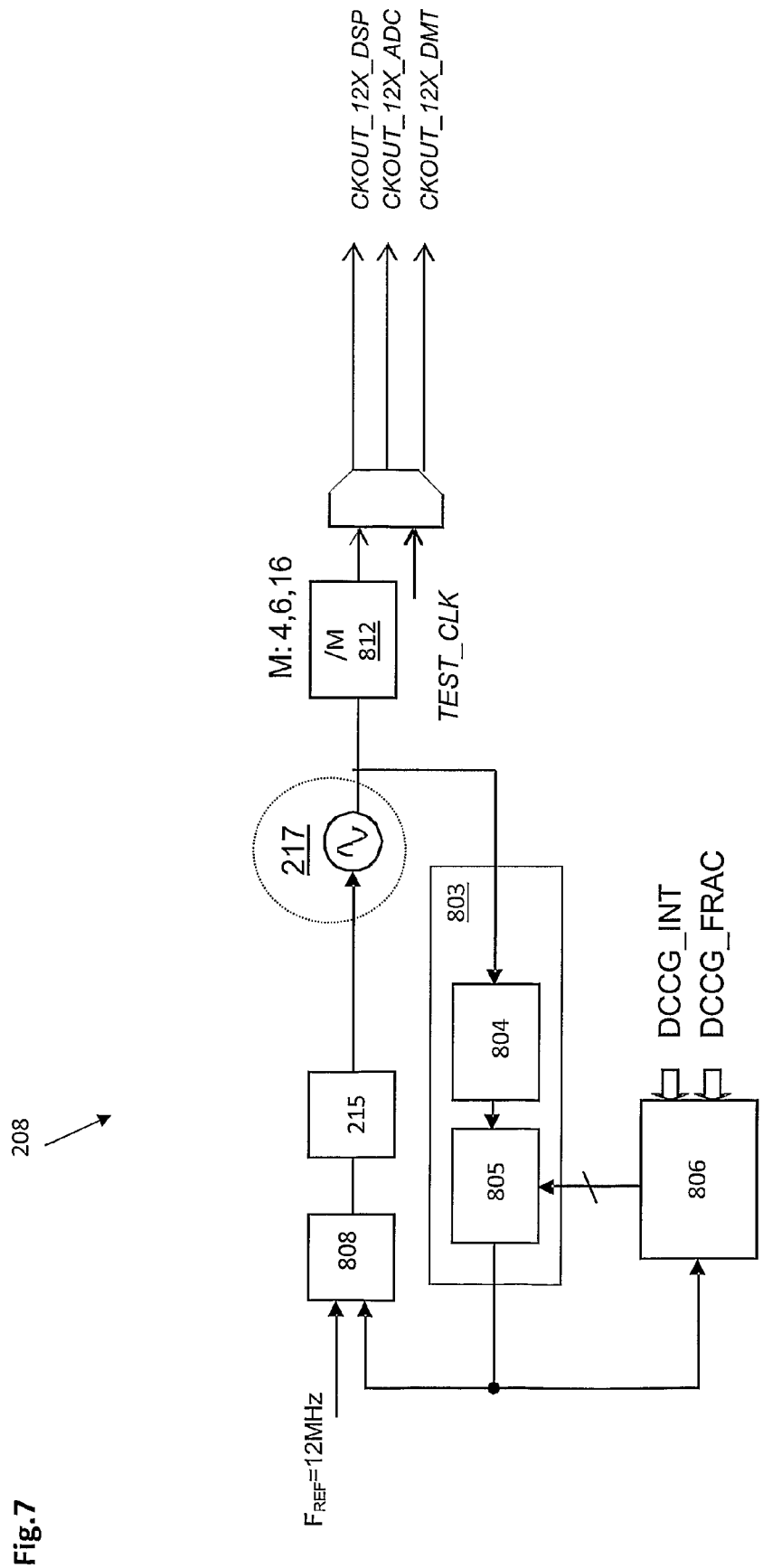
FIG. 7 shows an example of the clock 208.

FIG. 7 shows an example of the clock 208. The clock 208 comprises a voltage controlled oscillator (VCO) 217. According to one example, the VCO 217 is a 3-stage resistor-capacitor (RC) ring oscillator with (NMOS FET) varactor analogue tuning, and 4 bit digital coarse tuning. However, other types of VCO may be used as required and embodiments of the present invention should not be limited to this illustrative example. The clock 208 further comprises a phase lock loop feedback counter 803, the phase lock loop feedback counter further comprising a fixed "divide-by-2" CMOS prescaler 804 followed by a 5-bit programmable CMOS synchronous counter 805 controlled by a Multi-stAge noise SHaping (MASH) structure 806. The outputs of the MASH are combined through summations and delays to produce a binary output, the width of which depends on the number of stages (sometimes called the 'order') of the MASH. According to one example, the MASH 806 is a $3^{rd}$ order 20 bit MASH delta-sigma core, preferably running at 12 MHz to provide approximately 1 Hz resolution of the 1X system clock.

The clock also comprises a phase frequency detector (PFD) 808 which compares the phase of two input signals, in this case one from phase lock loop feedback counter 803 and one from the reference signal ($F_{REF}$=12 MHz). The outputs are fed to at least one low-pass filter 215 that passes low-frequency signals but attenuates signals with frequencies higher than a predetermined cutoff frequency. The output signal is fed to the voltage-controlled oscillator 217. The VCO provides an output clock at a certain frequency. According to preferred embodiment, the output frequency is in the range 380-490 MHz, depending on the broadcast reception mode. The VCO's output, which is also fed back to the phase lock loop feedback counter 803, passes through a programmable divider 812 to generate the master clock for the ADC (CKOUT_12X_ADC), DSP (CKOUT_12X_DSP) and DMT (debug and manufacturing test) functions (CKOUT_12X_DMT). According to a preferred embodiment, the programmable divider 812 can divide by factor M, where M is one of the following integers: 4, 6, 16. However, these are only provided as examples and other integers may be used as necessary. A test clock (TEST_CLK) may also be provided for testing and diagnostic purposes. A suitable selector is used to select the master clock for the ADC (CKOUT_12X_ADC), DSP (CKOUT_12X_DSP) and DMT (debug and manufacturing test) functions (CKOUT_12X_DMT) or test clock (TEST_CLK).

Thus, in operation, the phase frequency detector (PFD) 808 compares the fixed reference clock (e.g. the 12 MHz reference clock signal) with a variable "measurement" clock derived from phase lock loop feedback counter 803.

The clock 208 further comprises a reference clock oscillator 221 for providing a precision reference clock from an external crystal. The operation of the reference oscillator 221 will be well known to the person skilled in the art and will not be described in further detail in the specification.

The required M-divider ratio is selected by local decode logic based on a word value that corresponds to the broadcast reception mode, in this case a DCCG_MODE word value. The MASH 806 integer and fraction configuration bits are set by the DCCG_INT and DCCG_FRAC control words. Examples of PLL configuration (i.e. the selected VCO output frequency and the M factor) and clock output frequency against reception mode is tabulated below.

| DCCG_MODE | Standard | M | Clock 208 output (MHz) "CKOUT_12X" | VCO 217 frequency (MHz) |
| --- | --- | --- | --- | --- |
| 4 | DVB-8M | 4 | 109.7 | 438.8 |
| 3 | DVB-7M | 4 | 96 | 384 |
| 2 | DVB-6M | 6 | 82.3 | 493.8 |
| 1 | DVB-5M | 6 | 68.4 | 410.4 |
| 0 | DAB | 16 | 24.576 | 393.216 |

The clock multiplying PLL 208 also has a tuning resolution sufficient to meet the software demodulator algorithm requirements for timing acquisition and tracking. However, the tuning resolution requirement is generally achieved by design, and accordingly a high resolution fractional-N architecture is preferable.

Figure 8:
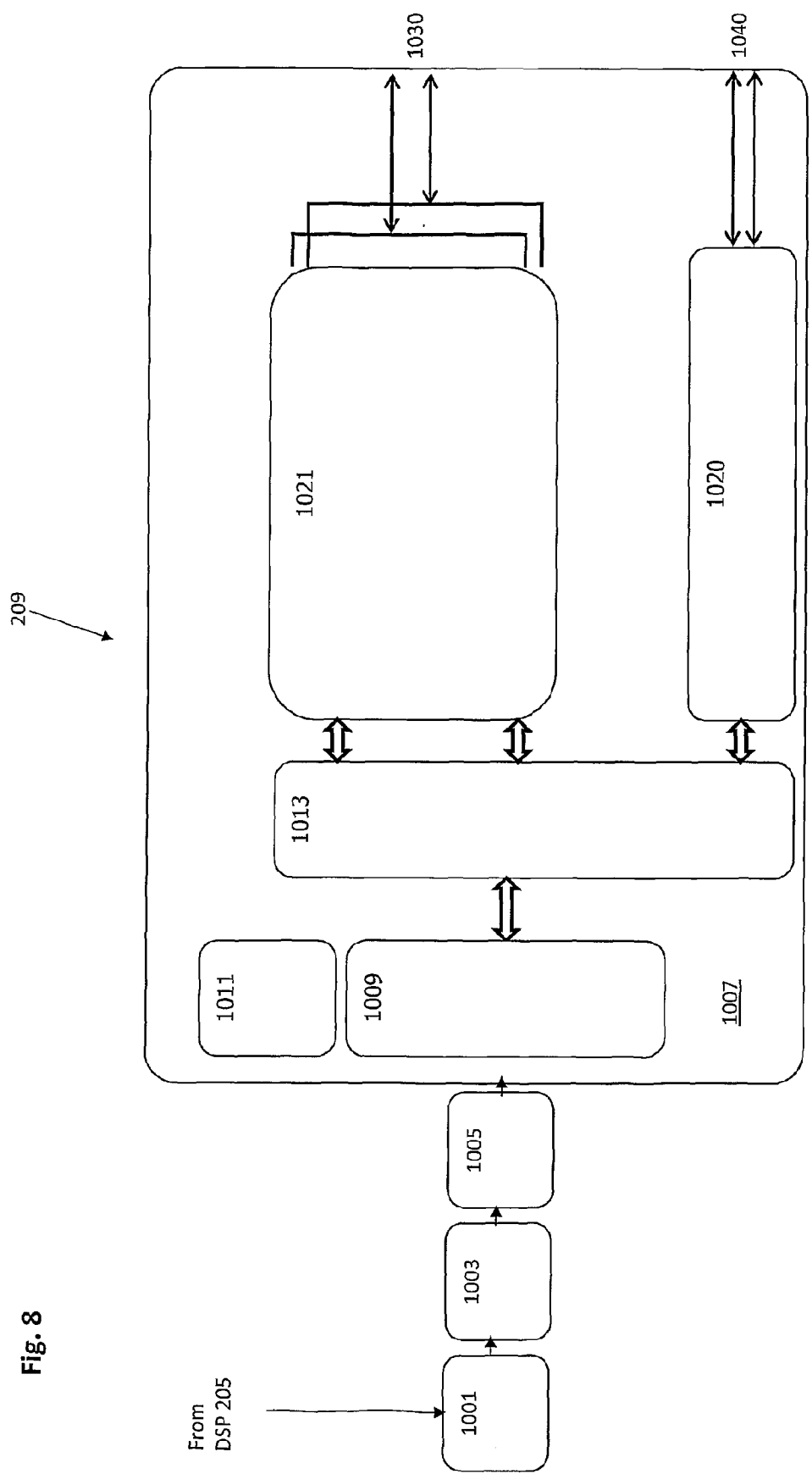
FIG. 8 shows an example of the computer interface 209.

FIG. 8 shows more detail of the computer interface 209 according to an embodiment of the invention. The computer interface 209 is operable to receive the processed digital output signal from the DSP 205, and further comprises: a resize buffer 1001, a compression buffer 1003 and a rate control/packetization module 1005. According to preferred embodiment of the present invention, data is transmitted from the bridge 20 to the computer 70 via a USB 2.0 interface. Accordingly, in this case the computer interface 209 may also further comprise a USB-specific interface 1007. However, other protocol specific interfaces may be used as appropriate, for example, FireWire.

Data generally arrives from the DSP 205 as a continuous stream running at the system's coded orthogonal frequency-division multiplexing (COFDM) sample rate. The interface 209 ensures this continuous stream is packetized for transfer to computer device 70 e.g. via USB (or some other suitable bus). According to embodiments of the invention, creating these packets is a two stage process: firstly, the data is compressed (if required) and resized, and then packed into data packets (for example 1024-byte packets) ready for transmission to computer 70. The latter may be considered "rate control and packetization" and refers to the process of writing data, which may or may not be compressed, into packets at the OFDM sample rate (a constant input rate), and then sending the packets to the computer 70 at the USB rate, for example, in packet size bursts of 3072 bytes per 125 us.

The signal output from the DSP 205 is clocked into the resize buffer 1001 until a complete "compression group" is collected. Once a first compression group is collected, a secondary buffer within the resize buffer is used to collect incoming samples in a second compression group while the first compression group is passed to the compression buffer 1003 for processing.

Figure 9A:
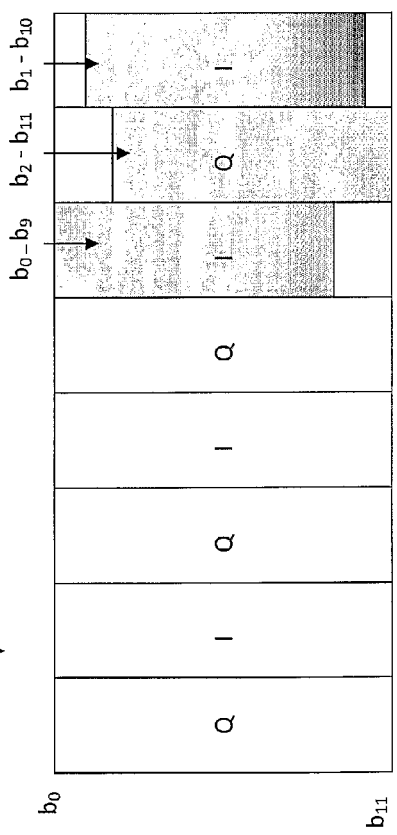
FIG. 9A shows an example of possible compression processes carried out according to an embodiment of the present invention.

FIG. 9A shows an example of possible compression processes carried out according to an embodiment of the present invention. Upon receiving an output from the resize buffer 1001, the compression buffer 1003 applies a configurable compression process on the compression group. According to the example shown in FIG. 9, the compression group 901 is a block of 8 DSP samples (in other words, 4 sample rate samples from each of the I and Q DSP paths) and the compression logic acts to reduce the bit width of each sample from 12 bits 901 to 10 bits 904. In FIG. 9A, the 12 bit samples are represented by bits $b_0$-$b_{11}$. The algorithm employed according to this example first finds the sample with the largest magnitude within the compression group. Next the returned magnitude is compared by a comparator to one of two predetermined thresholds (for example $2^9$, $2^{10}$) to determine which bits can be discarded safely. If the magnitude is above the higher threshold then the 2 least significant bits are discarded, with the remainder shown as shaded region $b_2$-$b_{11}$ in FIG. 9A. If the magnitude is below the lower threshold then the 2 most significant bits are discarded, with the remainder shown as shaded region $b_0$ -$b_9$ in FIG. 9A. Otherwise the magnitude is determined to be intermediate and one most and one least significant bits are each discarded, with the remainder shown as shaded region $b_1$-$b_{10}$ in FIG. 9A. Although each of the possible compression processes are shown on a single compression group for illustrative purposes in FIG. 9A, in reality, only one of the possible compression processes may carried out on each of the bits of a single compression group 901. Thus, each of the shaded regions constitutes a possible alternative. A 2 bit compression factor (e.g. 0, 1, 2) 905 representing the bits selected through the compression process is also generated for each sample group 904 to allow the samples to be correctly de-compressed in the host.

The result of this comparison determines which bits are selected for USB transmission in group 904. Outcomes of the compression process are exemplified in the table below.

| Threshold | Bits selected | Compression Factor |
|---|---|---|
| maximum magnitude (F) $\geq 2^{10}$ | b[11:2] | 2 |
| $2^9 \leq$ maximum magnitude $< 2^{10}$ | b[10:1] | 1 |
| maximum magnitude $< 2^9$ | b[9:0] | 0 |

Thus, according to one example where the broadcast reception mode is DVB 8 MHz, this compression technique reduces the required data rate by 4 Mbytes/s, from approximately 27.43 Mbytes/s to approximately 23.43 Mbytes/s.

According to one embodiment of the present invention, when operating at sample rates that produce data rates over a predetermined value, for instance more than 24.192 Mbytes/s, compression is always applied to ensure robust transmission over a single high bandwidth USB endpoint. However, when data rates are lower, it may not be necessary to use compression and the compression buffer 1003 may be bypassed. If the compression buffer determines that the data rates are below a predetermined value, e.g. 24.192 Mbytes/s, it will allow data to pass through without applying compression.

The rate control/packetization module 1005, packages the data for transmission to computer 70 over the USB interface 1007. Generally, if changes are applied to controllable aspects of the tuner 10 and/or bridge 20, for instance changes to gain or frequency, using USB is problematic since the USB interface is non-deterministic and therefore it is difficult to implement a control loop. According to embodiments of the present invention, control instruction identifiers are placed in a packet header portion 906 when data is packetized for transmission. This enables a controller 1101 residing in host processor in computer 70 to monitor control instructions and to close the control loop.

Figure 9B:
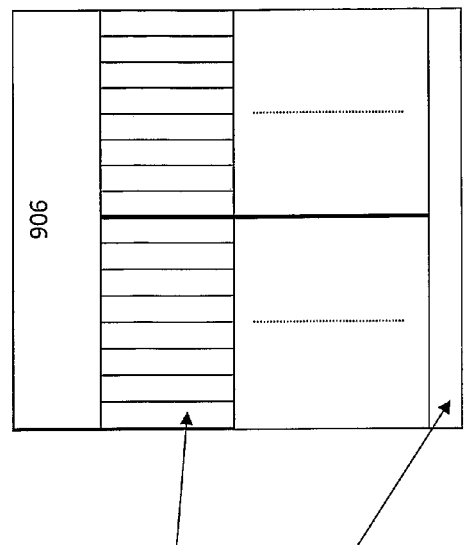
FIG. 9B shows an example of a data packet according to embodiments of the present invention.

FIG. 9B shows an example of a data packet according to embodiments of the present invention. The packet comprises: a header portion 906, a plurality of 10 bit sample groups 904 (in the example shown, 16×10 bit sample groups), and a plurality of the 2 bit compression factors 905 for each of the sample groups enabling correct de-compression in the host. According to preferred embodiment, a data packet is a 1024 byte packet suitable for USB data transmission.

The header portion 906 contains one or more control indicators representing the current status of controllable aspects of the tuner 10 and/or bridge 20. Examples include but are not limited to: gain values, frequency settings for the mixer/filter 106, sample frequency of the ADC 203, or any other controllable aspects of the tuner 10 and/or bridge 20.

Figure 10:
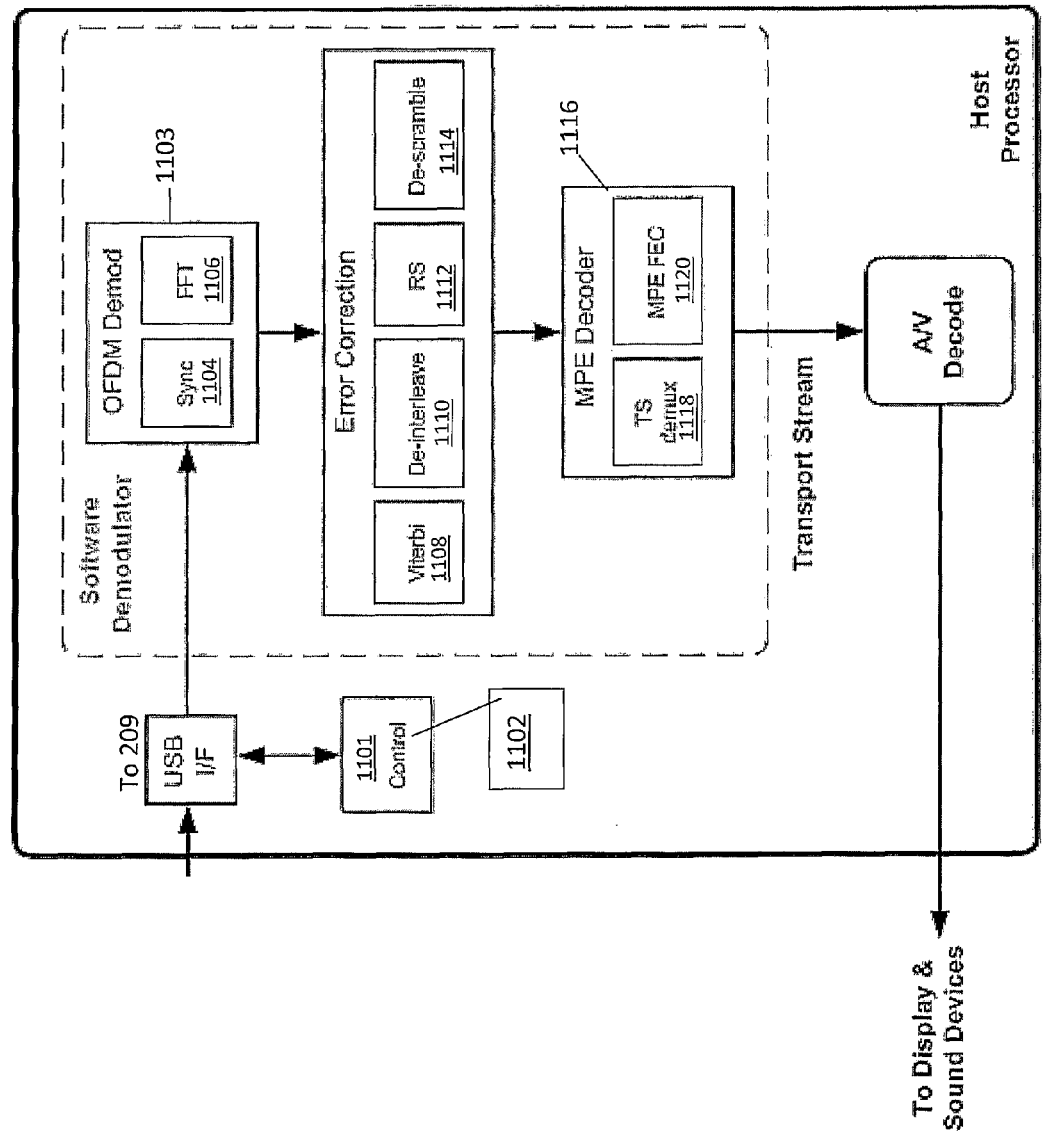
FIG. 10 shows more detail of the software demodulator according to an embodiment of the present invention.

Referring to FIG. 10, the host processor residing in computer 70 comprises a controller 1101, implemented in code or otherwise, for controlling aspects of the tuner 10 and/or bridge 20 through microcontroller 202. When control instructions are sent to the tuner 10 and/or bridge 20, for example to change the frequency settings for the mixer/filter 106, the control 1101 sends an appropriate instruction via computer interface 209 to microcontroller 202, which distributes a control instruction to the relevant system component. The controller 1101 further comprises a log 1102. When the control 1101 sends a control instruction; it simultaneously makes a record of the instruction in the log 1102. When data is packetized, as described with reference to FIG. 9B, the header portion 906 will contain one or more indicators representing the current status of controllable aspects of the tuner 10 and/or bridge 20. For instance, a header portion may contain an indicator representing the current frequency settings for the mixer/filter 106. The control 1101 is operable to compare the current status of controllable aspects of the tuner 10 and/or bridge 20 in the header portion 906 with data issued status recorded in the log 1102. If the two pieces of information are congruent, it is determined that the instruction has been successfully carried out and the next instruction can be sent and the log updated with the new information accordingly. The embodiments of the present invention therefore overcome the problems arising due to the non-deterministic nature of control instruction over USB.

According to an alternative embodiment, rather than creating a log of control information for comparison of information contained in data packet headers, the controller 1101 may wait a predetermined amount of time before issuing the next control instruction under the assumption that since the predetermined amount of time has passed, the control instruction will have been successfully carried out.

Once the data is packetized, it is suitable for transmission to computer 70 via the USB-specific interface 1007. The USB interface 1007 comprises at least the following known components: a Serial Interface Engine 1009, with an associated memory 1011, which handles most of the protocol in the USB 2.0 system; USB 2.0 Transceiver Macrocell Interface (UTMI) 1013, providing a standardized interface between the high-speed (480 MHz) USB 2.0 Transceiver 1021 and the Serial Interface Engine 1009 which runs the USB 2.0 protocol for a device; High-Speed Inter-Chip (HSIC) components 1020 to support an alternative USB physical interface. The exact functions and implementation details of each of these components will be clear to the person skilled in the art and accordingly will not be described in further detail in this specification.

After being compressed and/or packetized and transmitted over a suitable data path via feed paths 1030, 1040 to computer 70, the data packets are received by the software demodulator 300 for demodulation. The feed paths 1030, 1040 are also operable to receive data back from computer 70 for controlling aspects of the bridge 20 and/or tuner 10. On the computer 70, the data is received/transmitted by a complimentary interface, in this example a USB interface.

In previously known receiver systems, a demodulator circuit was typically used to recover the information content from the carrier wave of an incoming signal. However, rather than using a hardware demodulator, the software demodulator 30 of the embodiments of the present invention uses the processing power of a general-purpose processor in computer 70 in order to demodulate the incoming signal using one or more suitable software processes.

FIG. 10 shows more detail of the software demodulator according to an embodiment of the present invention 300. The incoming signal-from computer interface 209 first undergoes Orthogonal Frequency-Division Multiplexing (OFDM) demodulation. The OFDM demodulator 1102 comprises a synchronizer 1104 and a fast Fourier transform (FFT) module 1106. The signal then undergoes error correction. In general the error correction module 1108 comprises one or more of: viterbi 1108, de-interleave 1110, reed-soloman 1112, descramble 1114 and/or Multiprotocol Encapsulation (MPE) decoder 1116 modules. MPE decoder 1116 is implemented as a data link layer to deal with in particular features dictated by the DVB-H protocol.

For DVB-H MPE decoder 1116 further comprises a transport stream (TS) demultiplexer 1118 and Forward Error Correction FEC module 1120. Transport stream is a communications protocol for audio, video, and data which is specified as part of the MPEG-2 standard to allow multiplexing of digital video and audio and to synchronize the output. The TS demultiplexer 1118 performs the requisite multiplexing and synchronisation. Forward Error Correction (FEC) module 1120 provides an element of error control for data.

Once demodulation has been completed by the host general-purpose processor in computer 70, the output is provided to display and sound devices through a suitable decoder, for example, selected from a library of suitable decoders.

By shifting the burden of the demodulation to the general-purpose processor in computer 70, the software demodulator of embodiments of the present invention is advantageous over prior art technologies in that it adds flexibility through the ability to configure it to receive any broadcast standard. The broadcast receiver system of the present invention is not country or band specific, and the software demodulator 30 removes a previous hardware cast since there is no need to purchase demodulator hardware. This provides potential savings in terms of both size of the apparatus and the cost of its manufacture. Furthermore, the embodiments of the present invention provides a universal solution and removes the need for regional products. In addition, the software demodulator 30 can be upgraded (including to future broadcast standards) by software changes alone.

Those skilled in the art will appreciate that while this disclosure has described what is considered to be the best mode and, where appropriate, other modes of performing the invention, the invention should not be limited to the specific configurations and methods disclosed in this description of the preferred embodiment. Those skilled in the art will recognise that the invention has a broad range of applications in many different types of receiver systems, and that the embodiments of the present invention described in this disclosure may take a wide range of modifications without departing from the inventive concept as defined in the appended claims. For example, the embodiments of the present invention may be used in GPS and other data receiving applications.

The invention claimed is:

1. An interface circuit for a bridging circuit configured to connect between (a) a broadcast receiver tuner and associated circuitry for the receiving and processing of broadcast radio frequency signals and (b) a general purpose computer device programmed with software demodulation code configured to engage a general purpose processor in signal demodulation functions, the tuner being configured to receive instructions from the general purpose computer device via the bridging circuit and the bridging circuit being configured to send indications of the current status of controllable aspects of the tuner to the general purpose computer device, the interface circuit comprising:
    a data interface comprising a packetisation buffer connected to receive (i) digital signal sample data from a signal path of the tuner and associated circuitry and (ii) indications of control settings which have been applied to one or more configurable components of the tuner during taking of the sample data, said packetisation buffer being operable to construct packets comprising blocks of sample data and header information carrying said control settings indications; and
    a control interface configured to receive control instructions from tuner control code running on the general purpose computer device;
    the interface being configured for connection to a microcontroller of the bridging circuit, the microcontroller being operable to receive the control instructions from the control interface and distribute corresponding control settings to configurable components of the tuner and associated circuitry, said microcontroller also being operable to supply indications of relevant control settings to said packetisation buffer.

2. An interface circuit according to claim 1, wherein the indications of relevant control settings comprise data sampling rate indications applying in respect of the signal sample data.

3. An interface circuit according to claim 1, wherein the indications of relevant control settings comprise tuner frequency indications applying in respect of the signal sample data.

4. An interface circuit according to claim 1, wherein the indications of relevant control settings comprise tuner gain indications applying in respect of the signal sample data.

5. An interface circuit according to claim 1, comprising a compression buffer connected between (i) the tuner and associated circuitry and (ii) the packetisation buffer.

6. An interface circuit according to claim 5, wherein the microcontroller can disable or enable the compression in dependence upon whether or not the data transfer rate between the interface circuit and the general purpose computer device exceeds a predetermined threshold rate.

7. An interface circuit according to claim 5, wherein the compression buffer and associated logic implement a bit dropping algorithm.

8. An interface circuit according to claim 1, comprising a standard computer interface deployed between the interface circuit and the general purpose computing device.

9. An interface circuit according to claim 8, wherein said standard computer interface is a USB interface.

10. An interface configured to receive control instructions from computer code running on a general purpose computing device and configured to connect between (a) a demodulator implemented in software on the general purpose computing device and (b) an interface circuit associated with a separate hardware tuner for receiving broadcast signals, the interface circuit being a component of a bridging circuit between the hardware tuner and the general purpose computing device, the hardware tuner being configured to receive control signals from the general purpose computing device via the bridging circuit and the bridging circuit being configured to send indications of the current status of controllable aspects of the hardware tuner to the general purpose computing device, said interface comprising:
- a data interface for receiving packetised signal sample data including header information comprising control settings indications which are applied during taking of the sample data;
- a control interface operable to receive control instructions, from a tuner controller, setting control inputs of configurable components of the hardware tuner and further operable to forward said control instructions to a complimentary interface associated with the hardware tuner;
- the tuner controller, wherein the tuner controller is operable to issue control instructions intended to change a control setting of a configurable component of the hardware tuner; and
- a packet monitoring module operable to detect control settings indications for configurable components of the hardware tuner and to compare them with a log of at least one issued instruction to determine when an instruction issued by the tuner controller has been implemented at the configurable component of the hardware tuner.

11. An interface circuit according to claim 10, wherein the tuner controller is configured to issue instructions applying to an analogue to digital converter associated with the hardware tuner and a detected indication comprises a data sampling rate applying in respect of the signal sample data.

12. An interface circuit according to claim 10, wherein the tuner controller is configured to issue instructions applying to frequency selection of the hardware tuner and a detected indication comprises a tuner frequency applying in respect of the signal sample data.

13. An interface circuit according to claim 10, wherein the tuner controller is configured to issue instructions relating to amplifier gain of the hardware tuner and a detected indication comprises a gain value applying in respect of the signal sample data.

14. An interface according to claim 10, wherein said hardware tuner and modulator are capable of handling TV broadcast signals.

* * * * *